US012530984B2

(12) United States Patent
Romano et al.

(10) Patent No.: US 12,530,984 B2
(45) Date of Patent: Jan. 20, 2026

(54) WELDING SYSTEMS WITH AUTOMATIC WELDING INSTRUCTION GENERATION

(71) Applicant: Illinois Tool Works Inc., Glenview, IL (US)

(72) Inventors: Vincent Nicholas Romano, Pinckney, MI (US); Todd Michael McEllis, Jackson, MI (US); Leland Daryl Falde, Jackson, MI (US); Stephen P. Ivkovich, Petoskey, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/956,624

(22) Filed: Nov. 22, 2024

(65) Prior Publication Data

US 2025/0201138 A1    Jun. 19, 2025

Related U.S. Application Data

(60) Provisional application No. 63/609,536, filed on Dec. 13, 2023.

(51) Int. Cl.
| | |
|---|---|
| *G09B 19/24* | (2006.01) |
| *B23K 37/00* | (2025.01) |
| *G09B 5/02* | (2006.01) |
| *G09B 5/04* | (2006.01) |

(52) U.S. Cl.
CPC ............... *G09B 5/02* (2013.01); *B23K 37/00* (2013.01); *G09B 5/04* (2013.01); *G09B 19/24* (2013.01)

(58) Field of Classification Search
CPC .......... G09B 19/24; B23K 9/09; B23K 9/095; B23K 9/0953
See application file for complete search history.

(56) References Cited

U.S. PATENT DOCUMENTS

| | | |
|---|---|---|
| 6,337,458 B1 | 1/2002 | Lepeltier |
| 11,707,806 B2 | 7/2023 | Becker |
| 11,768,483 B2 | 9/2023 | Falde |
| 11,806,814 B2 | 11/2023 | Becker |
| 2008/0314887 A1 | 12/2008 | Stoger |
| 2009/0298024 A1 | 12/2009 | Batzler |
| 2012/0012561 A1 | 1/2012 | Wiryadinata |
| 2014/0263225 A1 | 9/2014 | Daniel et al. |
| 2014/0263226 A1 | 9/2014 | Daniel et al. |

(Continued)

OTHER PUBLICATIONS

European Patent Office, extended European Search Report, Application No. 24218855.5-1103, dated May 8, 2025, 8 pages.

*Primary Examiner* — Robert J Utama
(74) *Attorney, Agent, or Firm* — McAndrews, Held & Malloy, Ltd.

(57) ABSTRACT

In some examples, weld monitoring systems may use position tracking systems to track the positions, orientations, and/or movements of an (e.g., expert) operator performing a welding-type operation using a welding-type tool 106. An instruction generation process may then be used to automatically generate welding instructions based on the tracked positions, orientations, and/or movements. The welding instructions may be associated with a particular job, part, and/or welding position, and thereafter used to help guide future operators through similar welding-type operations when the future (e.g., less experienced operator) is working on a similar job/part and/or at a similar welding position.

20 Claims, 7 Drawing Sheets

(56) References Cited

U.S. PATENT DOCUMENTS

| | | |
|---|---|---|
| 2016/0107257 A1 | 4/2016 | Denis |
| 2016/0267806 A1 | 9/2016 | Hsu et al. |
| 2017/0200394 A1* | 7/2017 | Albrecht .................. G09B 9/00 |
| 2020/0130090 A1 | 4/2020 | Bonnell |
| 2020/0262009 A1 | 8/2020 | Becker |
| 2022/0063010 A1 | 3/2022 | Zwayer |
| 2022/0250183 A1 | 8/2022 | Knoener |
| 2022/0258267 A1 | 8/2022 | Becker |
| 2023/0066872 A1 | 3/2023 | Muske |
| 2023/0324178 A1 | 10/2023 | Becker |
| 2023/0330786 A1 | 10/2023 | Becker |
| 2024/0001491 A1 | 1/2024 | Becker |
| 2024/0012398 A1 | 1/2024 | Falde |
| 2024/0017342 A1 | 1/2024 | Becker |

* cited by examiner

WELDING SYSTEMS WITH AUTOMATIC WELDING INSTRUCTION GENERATION

TECHNICAL FIELD

This application claims priority to, and the benefit of, U.S. Provisional Patent Application No. 63/609,536, entitled "Welding Systems with Automatic Welding Instruction Generation," filed Dec. 13, 2023, the entire contents of which being hereby incorporated by reference.

The present disclosure generally relates to welding systems, and, more particularly, to welding systems with automatic welding instruction generation.

BACKGROUND

Welding instructions are used to guide welding operators through steps and/or stages of a welding process, such as when assembling a multiple-piece assembly involving multiple welds. The guidance is especially valuable for newer, less experienced, operators. However, even experienced operators can benefit from the step by step instructions.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to welding systems with automatic welding instruction generation, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, the same or similar reference numerals are used in the figures to refer to similar or identical elements.

DETAILED DESCRIPTION

Figure 1:
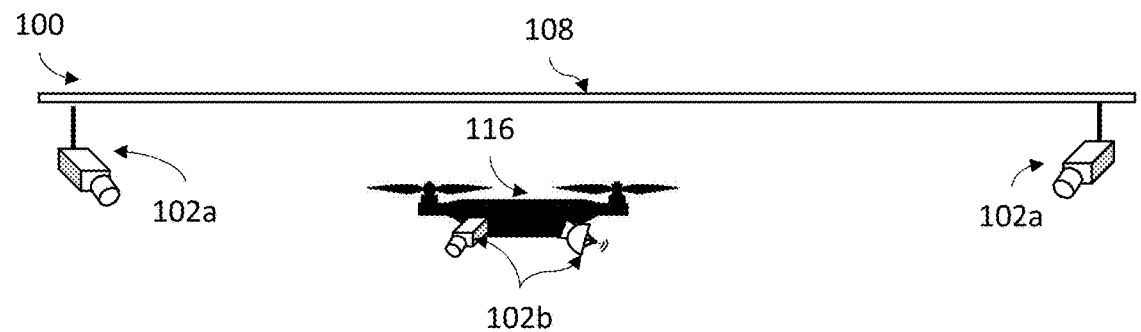
FIG. 1 shows an example of a weld monitoring system configured to track a position and/or orientation of an operator and/or welding-type tool in a welding area, in accordance with aspects of this disclosure.
Figure 1:
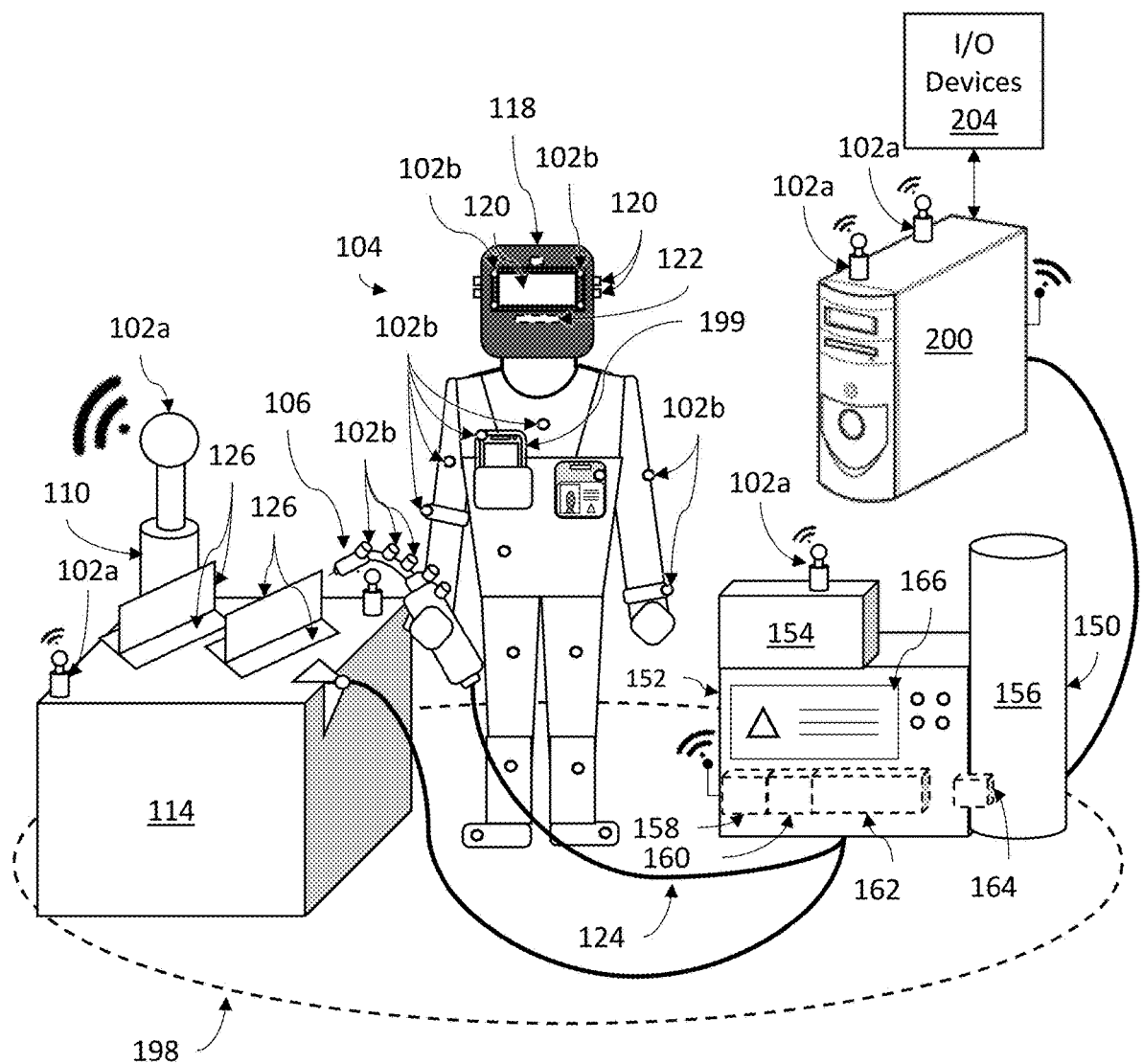

Some examples of the present disclosure relate to using tracked positions and/or orientations of (e.g., expert) operators and/or welding-type tools to automatically generate welding instructions to help guide a future (e.g., less experienced) operator through a similar welding-type operation. The welding instructions may be automatically provided to the future (e.g., less experienced) operator when the tool and/or operator is next detected to be proximate the appropriate (and/or similar) welding position. The automatic generation of the welding instructions may save a significant amount of time and/or resources that might otherwise typically go into the manual generation of the welding instructions. The automatic provision of appropriate welding instructions may reduce the risk of erroneous welding instructions being provided for a particular welding-type operation.

Some examples of the present disclosure relate to a welding system, comprising: a tracking system configured to track, during a welding-type operation, a tool position or a tool orientation of a welding-type tool, or an operator position or an operator orientation of a welding operator handling the welding-type tool; memory circuitry; and processing circuitry configured to: identify a welding technique parameter used during the welding-type operation, based on the tool position, the tool orientation, the operator position, or the operator orientation, generate one or more welding instructions for the welding-type operation based on the welding technique parameter, and record, in the memory circuitry, the one or more welding instructions.

In some examples, the welding technique parameter comprises a work angle of the welding-type tool, a travel angle of the welding-type tool, a travel speed of the welding-type tool, a travel direction of the welding-type tool, an aim of the welding-type tool, a distance between a contact tip of the welding-type tool and a workpiece being operated on, a weave frequency of the welding-type tool, a weave width of the welding-type tool, or a dwell time of the welding-type tool. In some examples, the one or more welding instructions pertain to how or when to perform the welding-type operation. In some examples, the one or more welding instructions comprise one or more visual, haptic, or audio instructions.

In some examples, the one or more welding instructions comprise one or more machine instructions. In some examples, the processing circuitry is further configured to: identify a welding position of the welding-type operation based on the tool position, the tool orientation, the operator position, or the operator orientation, and record, in the memory circuitry, an association between the welding position and the one or more welding instructions. In some examples, the tracking system comprises a sensor system configured to capture sensor data relating to the welding-type operation, or a workpiece or joint being operated on during the welding-type operation, the processing circuitry being configured to generate the one or more welding instructions based on the welding technique parameter and the sensor data.

In some examples, the sensor system comprises a plurality of sensors, and the processing circuitry is configured to select a particular sensor of the plurality of sensors, or position or orient the particular sensor, for capture of the sensor data based on the tool position, the tool orientation, the operator position, or the operator orientation. In some examples, the memory circuitry is configured to store a model of a part being operated on during the welding-type operation, the processing circuitry being configured to generate, for the welding-type operation, the one or more welding instructions based on the welding technique parameter and the model. In some examples, the processing circuitry is further configured to: identify a welding parameter used during the welding-type operation, wherein generating the one or more welding instructions comprises generating the one or more welding instructions based on the welding parameter and the welding technique parameter.

Some examples of the present disclosure relate to a method, comprising: tracking, during a welding-type operation, via a tracking system, a tool position or a tool orientation of a welding-type tool, or an operator position or an operator orientation of a welding operator handling the welding-type tool; identifying, via processing circuitry, a welding position of the welding-type operation, and a welding technique parameter used during the welding-type operation, based on the tool position, the tool orientation, the operator position, or the operator orientation; generating, via the processing circuitry, one or more welding instructions for the welding-type operation based on the welding technique parameter; and recording, in memory circuitry, the one or more welding instructions.

In some examples, the welding technique parameter comprises a work angle of the welding-type tool, a travel angle of the welding-type tool, a travel speed of the welding-type tool, a travel direction of the welding-type tool, an aim of the welding-type tool, a distance between a contact tip of the welding-type tool and a workpiece being operated on, a weave frequency of the welding-type tool, a weave width of the welding-type tool, or a dwell time of the welding-type tool. In some examples, the one or more welding instructions pertain to how or when to perform the welding-type operation. In some examples, the one or more welding instructions comprise one or more visual, haptic, or audio instructions.

In some examples, the one or more welding instructions comprise one or more machine instructions. In some examples, the method further comprises identifying, via the processing circuitry, a welding position of the welding-type operation based on the tool position, the tool orientation, the operator position, or the operator orientation, and recording, in the memory circuitry, an association between the welding position and the one or more welding instructions. In some examples, the method further comprises capturing, via a sensor system of the tracking system, sensor data relating to the welding-type operation, or a workpiece or joint being operated on during the welding-type operation; and generating, via the processing circuitry, the one or more welding instructions based on the welding technique parameter and the sensor data.

In some examples, the sensor system comprises a plurality of sensors, the method further comprising: selecting, via the processing circuitry, a particular sensor of the plurality of sensors, or positioning or orienting the particular sensor, for capture of the sensor data based on the tool position, the tool orientation, the operator position, or the operator orientation. In some examples, generating the one or more welding instructions comprises generating the one or more welding instructions based on the welding technique parameter and a stored model of a part being operated on during the welding-type operation. In some examples, the method further comprises identifying a welding parameter used during the welding-type operation, wherein generating the one or more welding instructions comprises generating the one or more welding instructions based on the welding parameter and the welding technique parameter.

FIG. 1 shows an example of a weld monitoring system 100. As shown, the weld monitoring system 100 includes a computing system 200 and several position tracking sensors 102. In some examples, the weld monitoring system 100 may use the computing system 200 and/or tracking sensors 102 to monitor the welding-type operations of an operator 104 and/or welding-type tool 106 (e.g., a welding torch/gun) within a welding area/cell 198. In some examples, the weld monitoring system 100 may further monitor the welding-type operations of the operator 104 and/or welding-type tool 106 in other welding areas/cells 198 (see, e.g., FIG. 6).

In some examples, the weld monitoring system 100 may use a variety of tracking sensors 102 to track the position and/or orientation of the operator 104 and/or welding-type tool 106. For example, some of the tracking sensors 102 shown in FIG. 1 are fixed sensors 102a that are shown attached to a fixture 108 (e.g., ceiling, floor, pillar, wall, door, railing, etc.). In some examples, the fixture 108 may be a building fixture 108 or a fixture 108 of a (e.g., manufacturing) facility 600 (see, e.g., FIG. 6). Some of the fixed sensors 102a are shown affixed to and/or integrated with a stanchion 110 that may be attached to a fixture 108 and/or weighted such that the stanchion 110 is substantially difficult to lift and/or move by hand. Some of the fixed sensors 102a are shown as affixed to welding equipment 150 and/or a welding bench 114. While shown as being attached to the welding equipment 150 and/or welding bench 114, in some examples, one or more of the fixed sensors 102a may instead be integrated into the welding equipment 150 and/or welding bench 114.

Some of the tracking sensors 102 shown in FIG. 1 are mobile tracking sensors 102b. For example, mobile tracking sensors 102b are shown attached to an unmanned aerial vehicle (UAV) 116, the operator 104 held welding-type tool 106, a mobile device 199 of the operator 104, an operator 104 worn welding helmet 118, and other operator 104 worn apparel (e.g., pants, shirt, vest, boots, gloves, badge, etc.). While the operator 104 is shown wearing a welding helmet 118 in the example of FIG. 1, in some examples, the operator 104 may alternatively, or additionally, wear (and/or the mobile sensors 102b may alternatively, or additionally, be attached to) some other headwear (e.g., goggles, face shield, headphones, earbuds etc.).

In some examples, one or more of the tracking sensors 102 may comprise camera, optical, magnetic, ultrasonic, acoustic, global positioning system (GPS), radio frequency identification (RFID), near field communication (NFC), and/or Bluetooth sensors. In some examples, the tracking sensors 102 are configured to capture sensor data that allows the computing system 200 to identify, monitor, and/or track the positions and/or orientations of the operator 104 and/or the welding-type tool 106. In some examples, one or more of the (e.g., mobile) sensors 102 may comprises active or passive markers that may be detected, recognized, and/or tracked by the other sensors 102 and/or the computing system 200 (e.g., via analysis of the sensor data).

In some examples, one or more of the tracking sensors 102 may include communication circuitry (and/or antennae) enabling the tracking sensors 102 to communicate sensor data captured and/or detected by the tracking sensors 102 to the computing system 200 (and/or other tracking sensors 102). In some examples, one or more of the tracking sensors 102 (and/or the UAV(s) 116 having the tracking sensor(s)

102) may receive (e.g., movement, reorientation, data capture, etc.) commands via the communication circuitry (and/or antennae). While fixed in place, some of the fixed sensors 102a may nevertheless include mechanisms enabling reorientation of the tracking sensors (e.g., for optimal data capture). In some examples, one or more of the tracking sensors 102 may be used to route, repeat, and/or amplify a communication signal sent by another tracking sensor 102 (e.g., to ensure the communication signal reaches the computing system 200).

In the example of FIG. 1, the computing system 200 is shown as having its own fixed tracking sensors 102a. In some examples, one or more of the tracking sensors 102a may be integrated into (e.g., instead of attached to) the computing system 200. The computing system 200 is further shown as having an antenna for communicating with the tracking sensors 102a (and/or other tracking sensors 102), as well as other devices. In some examples, the antenna may be part of computing communication circuitry 210 of the computing system 200 (see, e.g., FIG. 2a).

In the example of FIG. 1, the computing system 200 is also shown as having, and/or being connected to, computing input/output (I/O) devices 204. In some examples, the computing I/O devices 204 may include one or more computer mice, keyboards, (e.g., touch) display screens, speakers, microphones, haptic devices, lights, buttons, knobs, and/or other devices. In some examples, the tracking sensors 102 of the computing system 200 may be considered computing I/O devices 204.

In some examples, one or more helmet I/O devices 120 of the welding helmet 118 may be used as computing I/O devices 204. In some such examples, helmet circuitry 122 of the welding helmet 118 may communicate with the computing system 200 to relay I/O signals. In some examples, the helmet circuitry 122 of the welding helmet 118 may be used to implement some or all of the computing system 200.

In the example of FIG. 1, the computing system 200 is shown with a wired connection to welding-type equipment 150 in the welding area/cell 198. In some examples, the computing system 200 may additionally, or alternatively, be in wireless communication with the welding-type equipment 150 (and/or other welding-type equipment 150).

In the example of FIG. 1, the welding-type equipment 150 is shown as being connected to the welding-type tool 106 via welding cable 124. In some examples, the welding-type equipment 150 may deliver welding-type electrical power and/or consumables (e.g., welding wire and/or shielding gas) to the welding-type tool 106 via the welding cable 124. While only one cable 124 is shown in the example of FIG. 1 for the sake of simplicity and explanation, in some examples, the welding cable 124 may comprise a bundle of cables.

The welding-type equipment 150 is shown as including a welding-type power supply 152, a welding wire feeder 154, and a gas supply 156, coupled together. While shown as being a collection of connected but separate devices, in some examples, the welding-type equipment 150 may instead be integrated into fewer devices, and/or a single device (e.g., a combined welding-type power supply 152 and wire feeder 154).

In some examples, the wire feeder 154 houses a wire spool that is used to provide the welding-type tool 106 with a wire electrode (e.g., via the welding cable 124). In some examples, the wire feeder 154 further includes motorized rollers configured to feed the wire electrode to the tool 106 (e.g., from the spool) and/or retract the wire electrode from the tool 106 (e.g., back to the spool).

In some examples, the gas supply 156 supplies a shielding gas and/or shielding gas mixtures to the tool 106 (e.g., via welding cable 124). A shielding gas, as used herein, may refer to any gas (e.g., $CO_2$, argon) or mixture of gases that may be provided to the tool 106 and/or welding-type operation in order to provide a particular local atmosphere (e.g., shield the arc, improve arc stability, limit the formation of metal oxides, improve wetting of the metal surfaces, alter the chemistry of the weld deposit, and so forth).

In some examples, the welding-type power supply 152 supplies welding-type power to the tool 106 (e.g., via the welding cable 124). In the example of FIG. 1, the welding-type power supply 152 is shown as including power communication circuitry 158, power control circuitry 160, power conversion circuitry 162, a gas valve 164, and an operator interface 166.

The operator interface 166 is shown as comprising one or more adjustable inputs (e.g., knobs, buttons, switches, keys, etc.) and/or outputs (e.g., display screens, lights, speakers, etc.). In some examples, the operator 104 may use the operator interface 166 to enter and/or select one or more welding parameters (e.g., target output voltage, target output current, target output frequency, gas type, target preflow/postflow/purge/primary gas flow rate, target wire feed speed, wire type, wire diameter, workpiece material type, welding-type process, a burnback parameter, a crater fill parameter, a cooling system parameter, etc.). While shown as being part of the power supply 152, in some examples, the operator interface 166 may instead be part of a different part of the welding-type equipment 150.

As mentioned above, the welding-type power supply 152 is shown as including power communication circuitry 158. In some examples, the power communication circuitry 158 may include one or more antennas, wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the power communication circuitry 158 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.).

The welding-type power supply 152 is further shown as including power conversion circuitry 162. In some examples, the power conversion circuitry 162 is configured to receive input power (e.g., from mains power, a generator, etc.) and convert the input power to welding-type output power. In some examples, the power conversion circuitry 162 may include circuit elements (e.g., transformers, rectifiers, capacitors, inductors, diodes, transistors, switches, and so forth) capable of converting the input power to output power.

In some examples, the power conversion circuitry 162 may also include one or more controllable circuit elements. In some examples, the controllable circuit elements may comprise circuitry configured to change states (e.g., fire, turn on/off, close/open, etc.) based on one or more control signals. In some examples, the state(s) of the controllable circuit elements may impact the operation of the power conversion circuitry 162, and/or impact characteristics (e.g., current/voltage magnitude, frequency, waveform, etc.) of the output power provided by the power conversion circuitry 162. In some examples, the controllable circuit elements may comprise, for example, switches, relays, transistors, etc. In examples where the controllable circuit elements comprise transistors, the transistors may comprise any suitable transistors, such as, for example MOSFETs, JFETs, IGBTs, BJTs, etc.

As shown, the welding-type power supply 152 further includes control circuitry 160 electrically coupled to and/or configured to control the power conversion circuitry 162 and/or power communication circuitry 158. In some examples, the control circuitry 160 may include processing circuitry (and/or one or more processors) as well as analog and/or digital memory. In some examples, the control circuitry 160 is configured to control (e.g., the controllable circuit elements of) the power conversion circuitry 162, so as to ensure the power conversion circuitry 162 generates the appropriate welding-type output power for carrying out the desired welding-type operation. Though not shown for the sake of simplicity, in some examples, the control circuitry 160 may be further coupled to the operator interface 166, and/or configured to control the power conversion circuitry 162 according to inputs received via the operator interface 166.

In some examples, the control circuitry 160 is also electrically coupled to and/or configured to control the wire feeder 154, the gas supply 156, and/or a gas valve 164 (e.g., according to inputs received via the operator interface 166). In some examples, the control circuitry 160 may control the wire feeder 154 to output wire at a target speed and/or direction. For example, the control circuitry 160 may control the motor of the wire feeder 154 to feed the wire electrode to (and/or retract the wire electrode from) the tool 106 at a target speed. In some examples, the welding-type power supply 152 may control the gas supply 156 and/or gas valve 164 to output and/or allow for flow of a target type and/or amount gas.

In some examples, a welding-type operation (and/or welding process) may be initiated when the operator 104 activates (e.g., a trigger of) the welding-type tool 106. During the welding-type operation, the welding-type equipment may provide welding-type power and/or consumables to the welding-type tool 106 for the welding-type operation. The welding-type tool 106 may use the welding-type power and/or consumables to operate upon one or more workpieces 126.

When the welding-type operation is finished, the operator 104 may deactivate the welding-type tool 106 (e.g., by releasing the trigger). In some examples, the control circuitry 160 may detect activation and/or deactivation of the welding-type tool 106, and control the delivery and/or cessation of delivery of the welding-type power and/or consumables to the welding-type tool 106. In some examples, the control circuitry 160 may further control the power communication circuitry 158 to send one or more signals to the computing system 200 indicating when the welding-type tool 106 is activated and/or deactivated (and/or when the welding-type operation begins and/or ends).

Figure 2A:
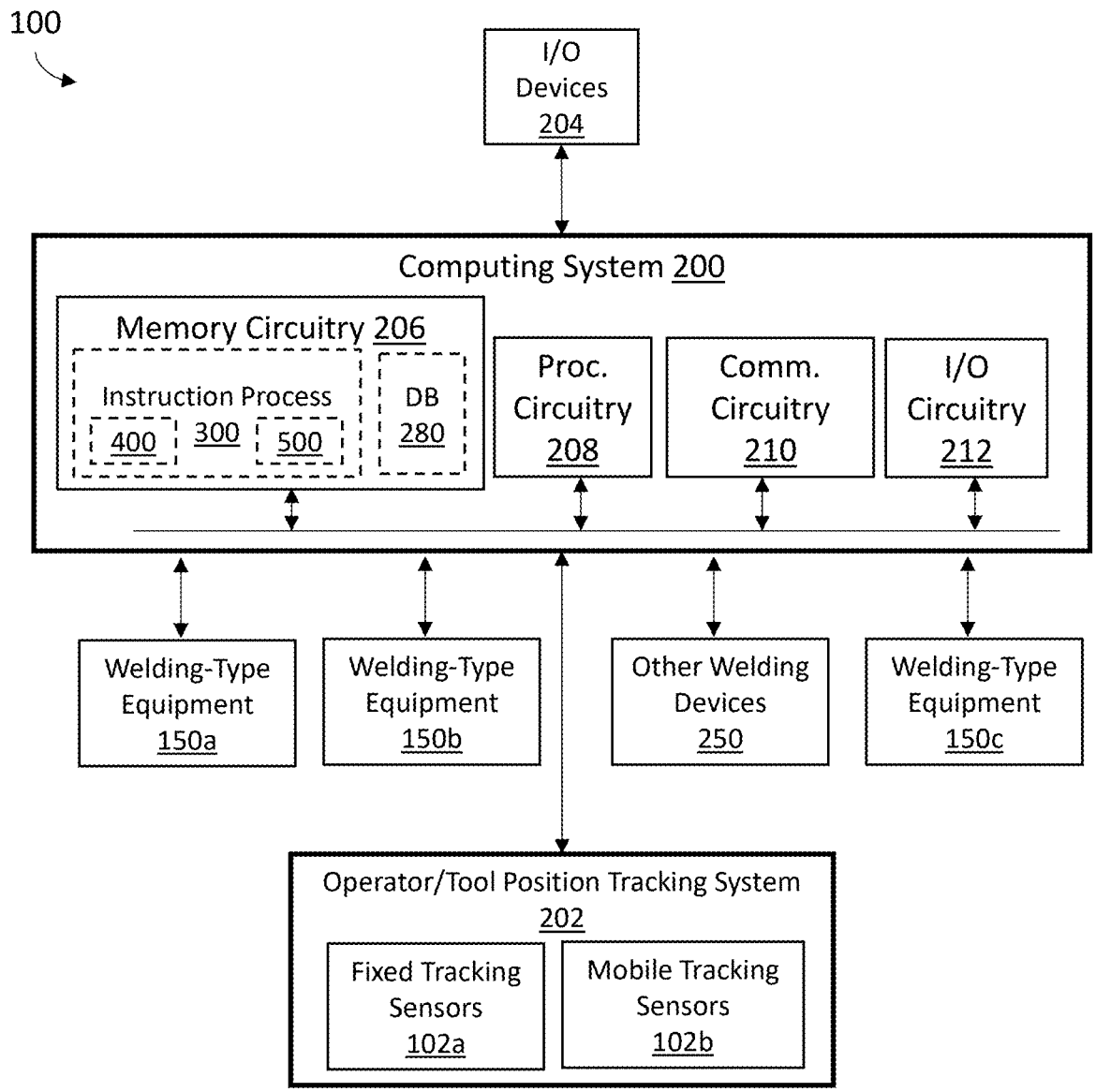
FIG. 2a is a block diagram of the example weld monitoring system of FIG. 1, in accordance with aspects of this disclosure.

FIG. 2a is a block diagram showing further details of the weld monitoring system 100 and, in particular, the components and/or connections of the computing system 200 of the weld monitoring system 100. In some examples, the computing system 200 may be implemented by way of a desktop computer, laptop computer, tablet computer, and/or a server computer. In the example of FIG. 2a, the computing system 200 is shown in communication with several different pieces of welding-type equipment 150, as well as other welding devices 250. In some examples, the other welding devices 250 may include the welding-type tool 106 (and/or other welding-type tools 106), the welding helmet 118 (and/or other welding helmets 118), one or more fume extractors, one or more welding robots, one or more cooling systems, and/or other relevant devices.

In the example of FIG. 2a, the computing system 200 is further shown as being in communication with a tracking system 202. The tracking system 202 is shown as being comprised of the fixed tracking sensors 102a and mobile tracking sensors 102b. In some examples, the tracking system 202 may further include additional tracking sensors.

The computing system 200 is also shown as comprising computing memory circuitry 206, computing processing circuitry 208, computing communication circuitry 210, and computing I/O circuitry 212. As shown, the computing memory circuitry 206, computing processing circuitry 208, computing communication circuitry 210, and computing I/O circuitry 212 are interconnected with one another via a common electrical bus.

In some examples, the computing I/O circuitry 212 may comprise one or more drivers for the computing I/O devices 204. In some examples, the computing I/O circuitry 212 may be configured to generate one or more signals representative of input received via the computing I/O devices 204, and provide the signal(s) to the bus. In some examples, the computing I/O circuitry 212 may also be configured to computing I/O devices 204 to generate one or more outputs in response to one or more signals (e.g., received via the bus).

In some examples, the computing communication circuitry 210 may comprise one or more antennas, wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the computing communication circuitry 210 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.).

In some examples, the computing processing circuitry 208 may comprise one or more processors. In some examples, the computing processing circuitry 208 may comprise one or more drivers for the tracking system 202. In some examples, the computing processing circuitry 208 may be configured to execute machine readable instructions stored in the computing memory circuitry 206.

In the example of FIG. 2a, the computing memory circuitry 206 includes (and/or stores) a database 280. In some examples, the database 280 may store data relating to, and/or representative of, welding jobs (and/or welding projects), parts manufactured through the welding jobs (e.g., via the joining/welding of two or more workpieces 126), positions (e.g., where the welding jobs occur), operators 104 (e.g., who work on manufacturing the parts during the welding jobs), tools 106 (e.g., used by the operators 104 to manufacture the parts during the welding jobs), and/or welding instructions (e.g., to help guide an operator 104 through manufacturing the parts during the welding jobs). In some examples, the database 280 may additionally store data relating to, and/or representative of, associations and/or relationships between the aforementioned data.

While shown as part of the computing memory circuitry 206 of the computing system 200 in FIG. 2a, in some examples, the database 280 may instead be separate from the computing memory circuitry 206, and/or separate from (yet in communication with) the computing system 200. While one database 280 is shown in the example of FIG. 2a for the sake of simplicity, in some examples, the weld monitoring system 100 may include several databases 280.

Figure 2B:
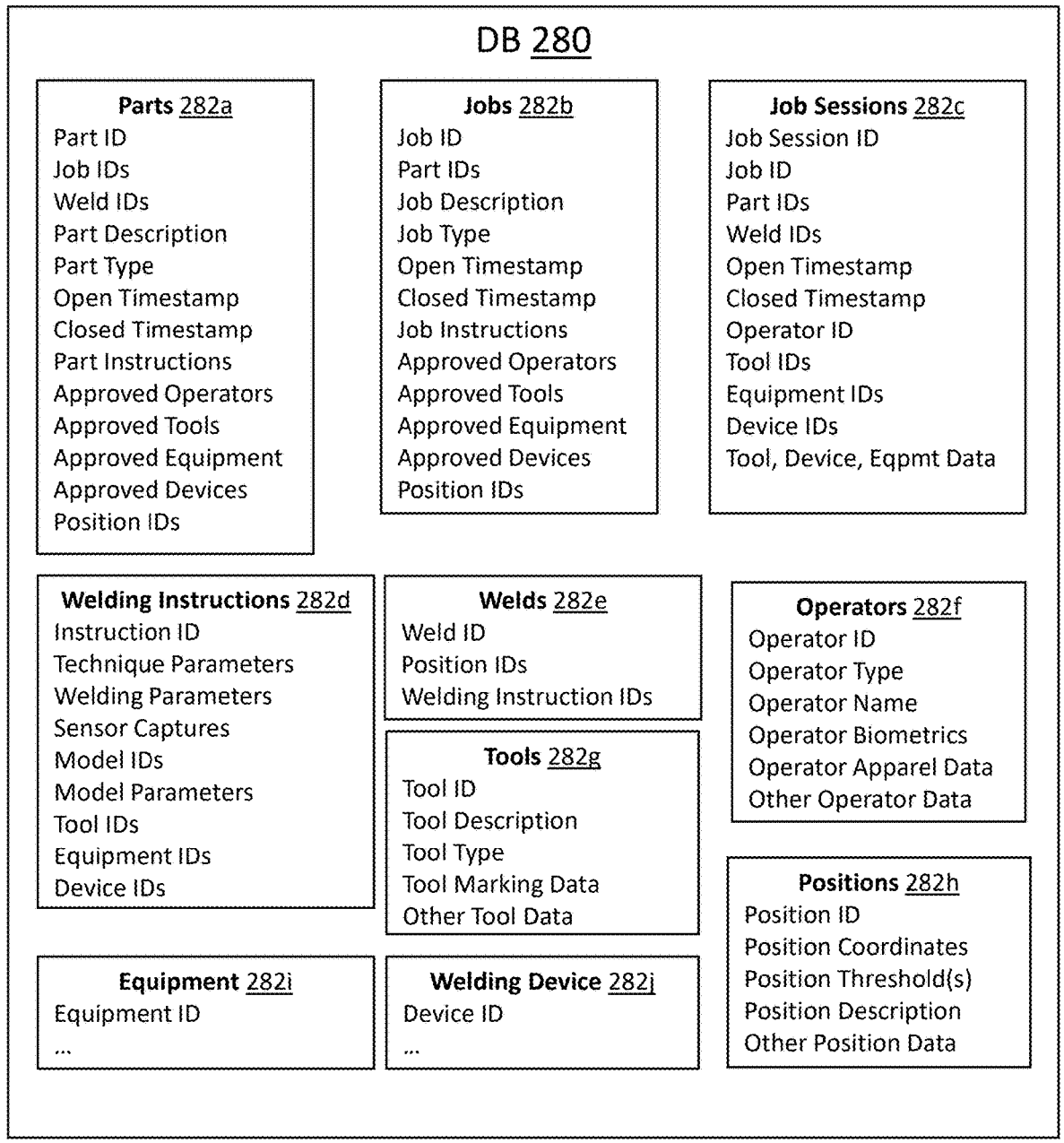
FIG. 2b is a diagram illustrating an example database that may be used in or with the weld monitoring system of FIG. 2a, in accordance with aspects of this disclosure.

FIG. 2b shows an example design of the database 280. Though the database 280 is depicted as a relational database 280, in some examples, one or more other types of databases 280 may be used.

The database 280 is shown as organizing data in and/or according to a set of tables 282. In particular, the database 280 is shown as organizing data in and/or according to a Parts table 282a, a Jobs table 282b, a Job Sessions table 282c, a Welding Instructions table 282d, a Welds table 282e, an Operators table 282f, a Tools table 282g, a Positions table 282h, an Equipment table 282i, and a Welding Devices table 282j. In some examples, more or fewer tables 282 (and/or columns of the tables 282) may be used. While some example tables 282 are shown in the example of FIG. 2b as belonging to the database 280, in some examples, the tables 282 may be spread across several databases 280.

In some examples, related data in may be organized (and/or associated together) in a row of a particular table 282. Additionally, the data for a particular row of a table 282 may be organized according to the columns of the table 282. While each table 282 has its own distinct columns, all the tables 282 are shown as including at least an identifier column.

For example, the Parts table 282a includes a Part ID column, the Jobs table 282b includes a Job ID column, the Job Sessions table 282c includes a Job Session ID column, the Welding Instructions table 282d includes an Instruction ID column, the Welds 282e table includes a Weld ID column, and so on and so forth. A unique (e.g., alphanumeric) identifier may be generated and/or stored in the ID column of a table 282 for each row of the table 282. In some examples, the identifier data in the ID column may be used to identify and/or reference the row of the table 282 to which identifier data belongs.

Additionally the row identifier data may be used to associate and/or relate together information (and/or rows) in different tables 282. For example, each row in the Parts table 282a is associated with one or more jobs via the Job IDs column of the Parts table 282a, and the Job ID column of the Jobs table 282b. Likewise, each row of the Jobs table 282b is associated with one or more parts via the Part IDs column of the Jobs table 282b and the Part ID column of the Parts table 282a (though, in some examples, a job may not be associated with a part). And each row of both the Parts table 282a and the Jobs table 282b is associated with one or more positions via the Position IDs columns of the Parts table 282a and the Jobs table 282b, as well as the Position ID column of the Positions table 282h.

In this way, the database 280 may organize and/or associate together a substantial amount of information relating to the jobs and/or parts on which an operator 104 and/or welding-type tool 106 is working, as well as the welds for each part, and the welding instructions for each weld. For example, the database 280 may store data about each part, each weld of the part, and the welding instructions for each weld, using the Parts, Welds, and Welding Instructions tables 282. The database 280 may associate together information about a part and the welds for the part with a row in the Parts table 282a that references the appropriate welding identifiers of the welds in the Welds table 282e. The database 280 may further associate each weld with both welding instructions and one or more positions with a row in in the Welds table 282e that references the appropriate position and welding instruction identifiers in the Positions and Welding Instructions tables 282. Such organization may enable the monitoring system 100 to automatically output stored welding instructions for a particular weld when an operator 104 and/or tool 106 are detected to be proximate a particular stored position.

In the example of FIG. 2a, the computing memory circuitry 206 further includes (and/or stores) an instruction process 300. As shown, the instruction process 300 is comprised of an instruction generation process 400 and an instruction output process 500. In some examples, the instruction process 300, instruction generation process 400, and/or instruction output process 500 may comprise machine readable instructions configured for execution by the system computing processing circuitry 208. In some examples, the computing memory circuitry 206 may further include (and/or store) certain parameters and/or thresholds used in the instruction process 300, instruction generation process 400, and/or instruction output process 500.

Figure 3:
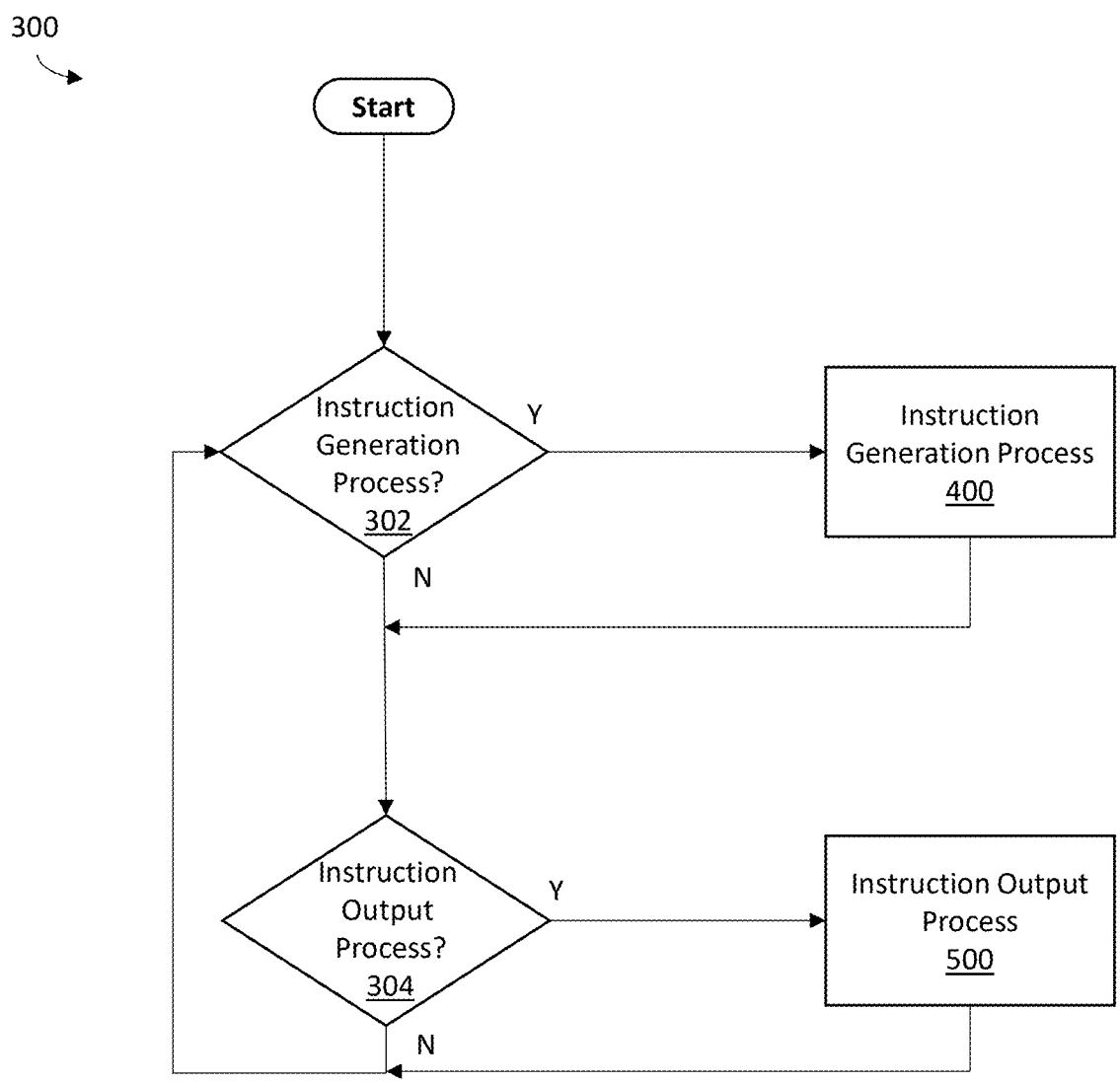
FIG. 3 is a flow chart illustrating an example instruction process of the weld monitoring system of FIG. 2a, in accordance with aspects of this disclosure.

In some examples, the instruction process 300 may be used to switch between the instruction generation process 400 and the instruction creation process 500 (see, e.g., FIG. 3). During the instruction generation process 400, the monitoring system 100 may automatically identify welding positions and generate welding instructions for each welding position. In particular, during the instruction generation process 400, the monitoring system 100 may track the position(s) and/or orientation(s) of an operator 104 and/or tool 106 using the tracking system 202, and use the tracked positions/orientation of the operator 104 and/or tool 106 (in conjunction with other information) to identify welds (and/or welding positions) of a job and/or part, and generate/record welding instructions corresponding to each weld (and/or welding position). During the instruction output process 500, the system 100 may output the recorded welding instructions when an operator 104 and/or tool 106 is next proximate a similar welding position, to help guide the operator 104 through the welding-type operation.

Figure 4:
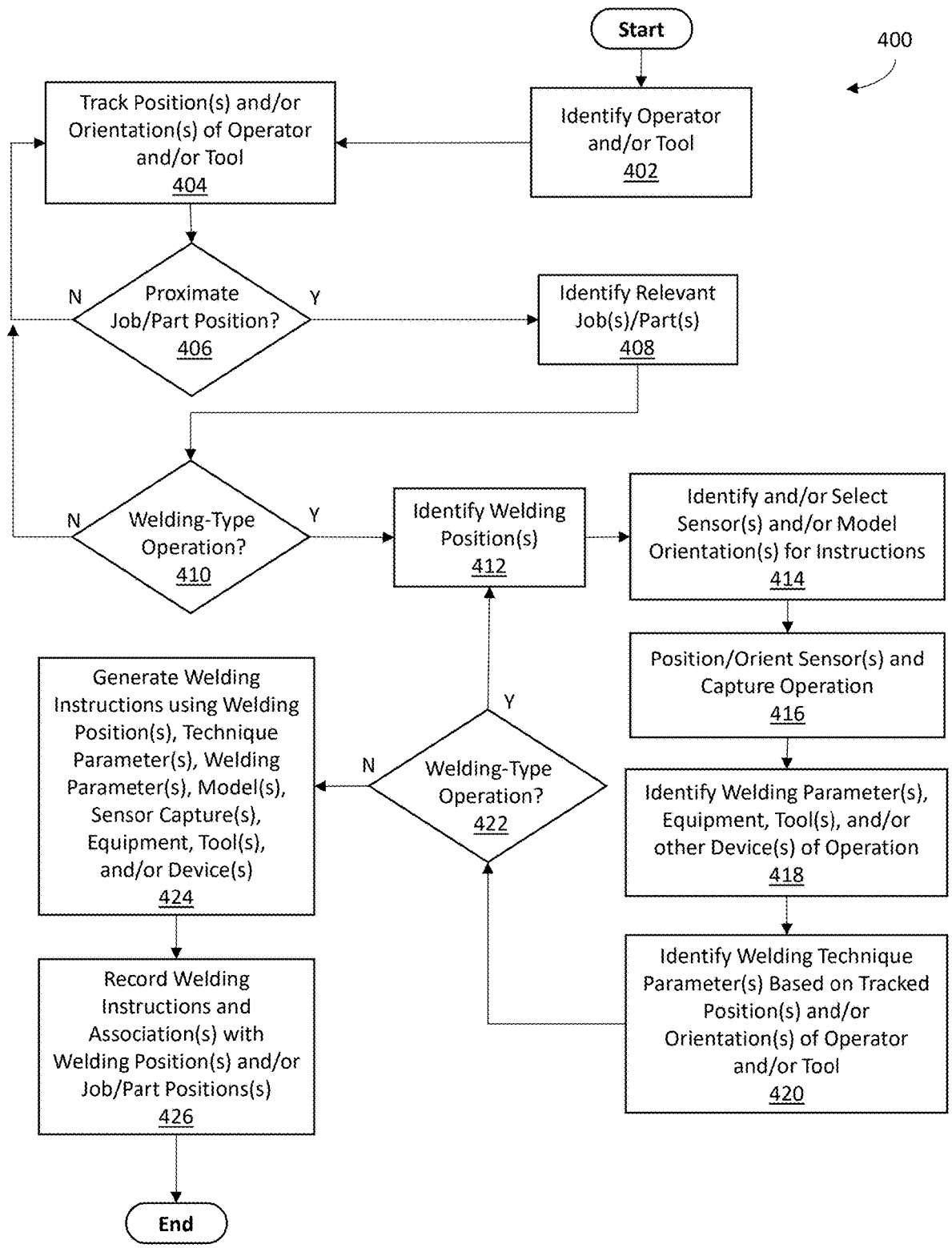
FIG. 4 is a flow chart illustrating an example instruction generation process of the instruction process of FIG. 3, in accordance with aspects of this disclosure.
Figure 5:
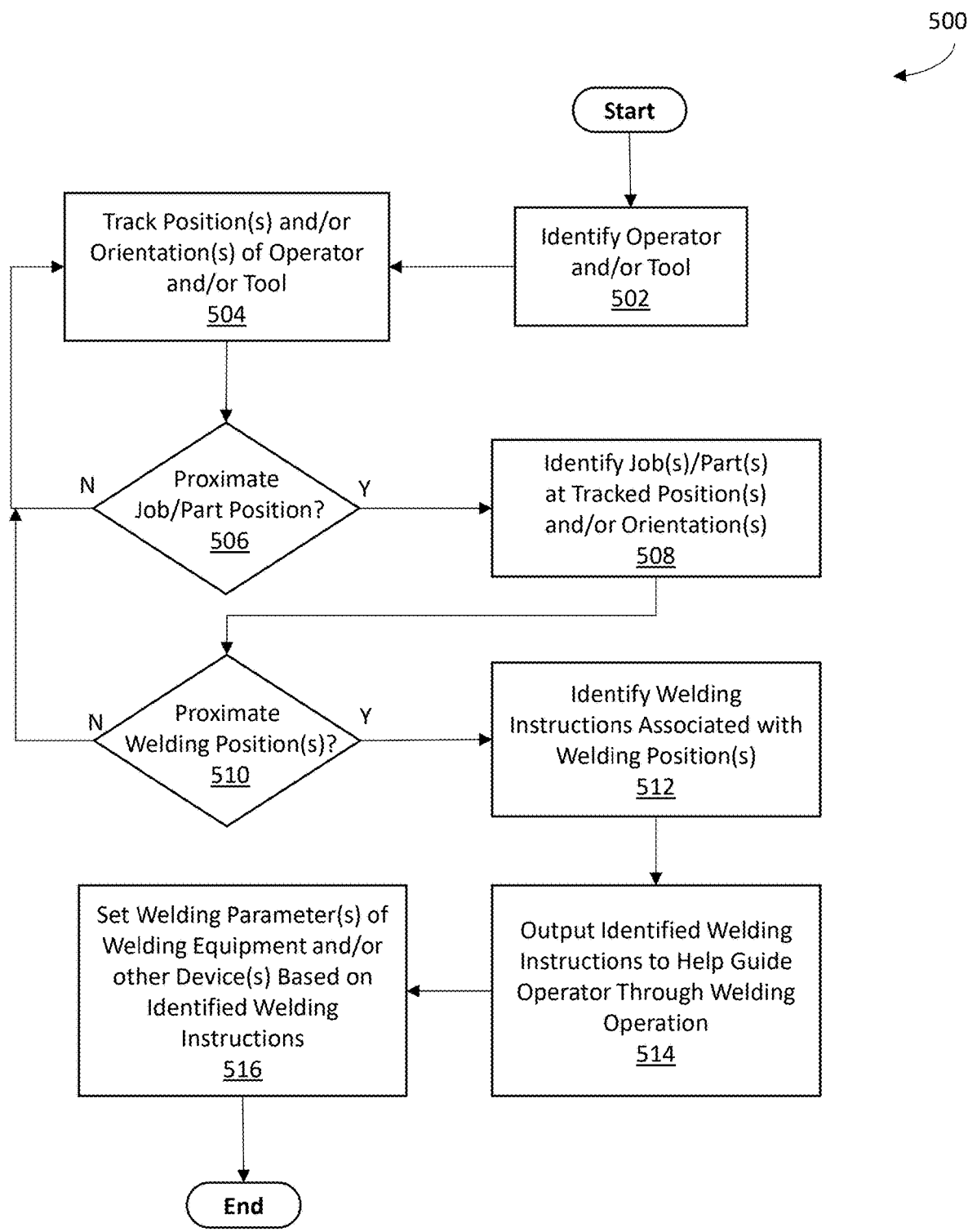
FIG. 5 is a flow chart illustrating an example instruction output process of the instruction process of FIG. 3, in accordance with aspects of this disclosure.

FIGS. 3-5 are flowcharts showing example operation of the instruction process 300, instruction generation process 400, and instruction output process 500. While the instruction process 300, instruction generation process 400, and/or instruction output process 500 are sometimes discussed below as performing certain actions, this is a shorthand for referring to action taken during the instruction process 300, instruction generation process 400, and/or instruction output process 500 by one or more components of the weld monitoring system 100 (e.g., tracking sensors 102, computer processing circuitry 208, computing I/O devices 204, etc.). While shown as single processes in the example of FIGS. 3-5, in some examples, multiple instances of the instruction process 300, instruction generation process 400, and/or instruction output process 500 may execute simultaneously and/or in parallel.

In the example of FIG. 3, the instruction process 300 executes either the instruction generation process 400 or the instruction output process 500, depending on input received (e.g., via the I/O devices 204) and evaluated at blocks 302 and 304. For example, the instruction process 300 may receive input selecting the instruction generation process 400 when an expert operator 104 is going to demonstrate how to correctly perform one or more welding-type operations. Afterwards, when a different (e.g., less experienced)

operator 104 is going to perform the welding-type operations, the instruction process 300 may receive input selecting the instruction output process 500.

FIG. 4 is a flowchart showing an example operation of the instruction generation process 400. As shown, the instruction generation process 400 begins at block 402 where the instruction generation process 400 identifies the operator 104 and/or tool 106 that should be tracked during the instruction generation process 400 (e.g., using the tracking system 202).

In some examples, the particular operator 104 and/or tool 106 may be identified using an operator identifier and/or tool identifier used to reference information about the particular operator 104 and/or tool 106 in the database 280 (e.g., in the Operators table 282f and/or Tools table 282g). In some examples, identifying the operator 104 may involve identifying the mobile device 199 of the operator and/or the apparel being worn by the operator 104.

In some examples, the particular operator 104 may login to the system 100 (e.g., via the I/O devices 204), with operator credentials that are associated with identifying information about the operator 104 and/or tool 106 (e.g., via one or more accounts and/or one or more rows of Operators table 282f). As another example, the operator 104 may have a badge, ID card, mobile device 199, and/or other item that stores identifying information, and the identifying information may be read and/or scanned off the badge, ID card, mobile device 199, and/or other item (e.g., by a tracking sensor 102 of the computing system 200). As another example, the operator 104 may provide biometric information (e.g., read/detected by one or more of the mobile tracking sensors 102b of the helmet 118), and the biometric information may be used as identifying input.

In examples where the operator 104 provides identifying input, the identifying input may be associated in the database 280 with information about the mobile device 199 of the operator 104, the operator 104 worn apparel, and/or the tool 106. For example, in FIG. 2b, the Operators table 282f has Operator Apparel Data associated with each Operator ID, and the Tools table 282g has Tool Marking Data associated with each Tool ID. In some examples, the Other Operator Data of the Operators table 282f may store data pertaining to the mobile device 199. The instruction process 300 may thereby query the database 280 using the identifying input and obtain the information necessary to identify, recognize, and/or track the operator 104 and/or tool 106.

In some examples, the instruction process 300 may be able to track the operator 104 and/or the tool 106 without the need for any input from the operator 104 (or with no more than an indication of the operator/tool identifier(s) to be tracked). For example, the mobile device 199 and/or the welding helmet 118 (and/or other apparel worn by the operator 104) may be imprinted with (and/or have attached) the operator identifier of the operator 104. As another example, the tool 106 may be imprinted with (and/or have attached) the tool identifier of the tool 106. In such examples, the tracking system 202 may be able to recognize and/or read the operator ID and/or tool ID from the tool 106 and/or (e.g., apparel and/or mobile device 199 of) the operator 104, and thereby recognize which operator 104 and/or tool 106 is being tracked. As another example, the mobile tracking sensors 102b attached to the tool 106, mobile device 199, and/or apparel of the operator 104 may be encoded with the operator ID and/or tool ID, and/or communicate the operator ID and/or tool ID to the fixed tracking sensors 102a during tracking of the tool 106 and/or operator 104.

In the example of FIG. 4, after block 402, the instruction generation process 400 tracks the position(s) and/or orientation(s) of the tool 106 and/or the operator 104 at block 404. In some examples, the tracking may be performed by the tracking system 202 and/or computing system 200 of the weld monitoring system 100. In some examples, the tracking may involve the capture of sensor data by the tracking system 202.

In some examples, the tracking may involve communications between tracking sensors 102 of the tracking system 202. In some examples, the tracking may involve analysis of the sensor data and/or the communications of the tracking sensors 102. In some examples, the tracking may involve analysis of detected and/or stored positions of certain (e.g., fixed) tracking sensors 102. In some examples, the tracking may involve time of flight, trilateration, triangulation, and/or computer vision analysis. In examples where the tracking fails for some reason (e.g., operator 104 and/or tool 106 no longer in facility 600) the instruction generation process 400 may use one or more null values for the position(s) and/or orientation(s).

While, in some examples, position tracking data might be considered more valuable with respect to the tool 106 than the operator 104, there may be instances in which the tool 106 is not known, and/or is unable to be tracked for some reason. In such examples, it may be helpful to track the operator 104 as an approximation of the position of the tool 106. In some examples, the orientation of the operator 104 may refer to the direction the operator 104 (and/or the face, torso, feet, etc. of the operator 104) is facing, and/or the orientation of different portions of the operator 104 (e.g., hands, feet, arms, legs, head, etc.) relative to one another and/or some reference frame.

As shown, after block 404, the instruction generation process 400 proceeds to block 406 where the instruction generation process 400 determines whether the tracked position(s) of the tool 106 and/or the operator 104 are proximate a position of a job and/or part. For example, there may be a welding job that entails manufacturing a part (e.g., comprised of two or more workpieces 126) via one or more welds (e.g., at one or more joints between workpieces 126). And welding-type operations relating to that job (and/or part manufacture) may be slated to occur in certain welding areas 198 (e.g., having certain workpieces 126 and/or proximate certain equipment 150; see, e.g., FIG. 6). In some examples, the database 280 may associate a job and/or part with one or more positions in and/or near the appropriate welding area(s) (e.g., using job, part, and/or position identifiers).

In the example database 280 shown in FIG. 2b, the Positions table 282h is designed to store one or more thresholds associated with each position. A position combined with a threshold may define a sphere having a center at the position and a radius defined by the threshold. Thus, at block 406, the instruction generation process 400 may determine whether the tracked position(s) of the tool 106 and/or operator 104 are within one or more spheres defined by one or more positions and/or thresholds associated with a job/part stored in the database 280.

In some examples, a position combined with a threshold may instead define an infinite and/or unbounded cylinder. For example, the finite threshold(s) may only be applied to two coordinate axis, and an infinite threshold may be applied to the third (e.g., height) coordinate axis. Alternatively, some other threshold(s) may be applied to define a shape that is bounded in one (e.g., height) coordinate axis at, near, or above/below the ceiling/floor. This may prevent an operator 104 and/or tool 106 from being determined not to be proximate a position because the position of the operator 104 and/or tool 106 is too high/low (e.g., close to a ceiling/floor of the facility 600).

In some examples, a position may be associated with two or more thresholds. In some such examples, overlapping spheres and/or cylinders may be defined. In some such examples, the positions where the spheres and/or cylinders do not overlap may be considered outer boundary positions, where orientation(s) of the tool 106 and/or operator 104 is also considered when determining position proximity at block 406. For example, a tool 106 and/or operator 104 may not be considered proximate a position at block 406 if the tool 106 and/or operator 104 is positioned at an outer boundary position and the orientation of the tool 106 and/or operator 104 is not oriented towards the position (e.g., within some other threshold associated with the position). In some examples, the vertical component of the orientation may be disregarded similar to what is discussed above to avoid too high/low situations.

In some examples, the instruction generation process 400 may use a different procedure (e.g., rather than relying on thresholds) for determining whether the tracked position(s) of the tool 106 and/or the operator 104 are proximate a position of a job and/or part at block 406. For example, the instruction generation process 400 might identify which stored position (e.g., of a job and/or part) is closest to the tracked position(s) of the tool 106 and/or the operator 104, and identify the tool 106 and/or the operator 104 as being proximate that stored position. As another example, the instruction generation process 400 may make use of one or more artificial intelligence and/or machine learning techniques to make a determination as to whether the tracked position(s) of the tool 106 and/or the operator 104 are proximate a position of a job and/or part.

In some examples, the instruction generation process 400 may receive an input (e.g., via the I/O devices 204) that manually identifies the operator 104 and/or tool 106 as working on a particular job and/or part. In such examples, the instruction generation process 400 may determine that the tool 106 and/or operator 104 is proximate the job and/or part as a matter of course, regardless of the actual position and/or orientation of the operator 104 and/or tool 106.

In some examples, the instruction generation process 400 may receive an input (e.g., via the I/O devices 204) that manually identifies the operator 104 and/or tool 106 as working on (and/or proximate) one or more particular jobs and/or parts. In some examples, the operator 104 and/or tool 106 may only be approved to work on one or more particular jobs and/or parts (e.g., via associations in the Parts and/or Jobs tables 282). In such examples, the instruction generation process 400 may only determine whether the tracked position(s) of the tool 106 and/or the operator 104 are proximate the approved and/or manually identified jobs and/or parts at block 406.

Figure 6:
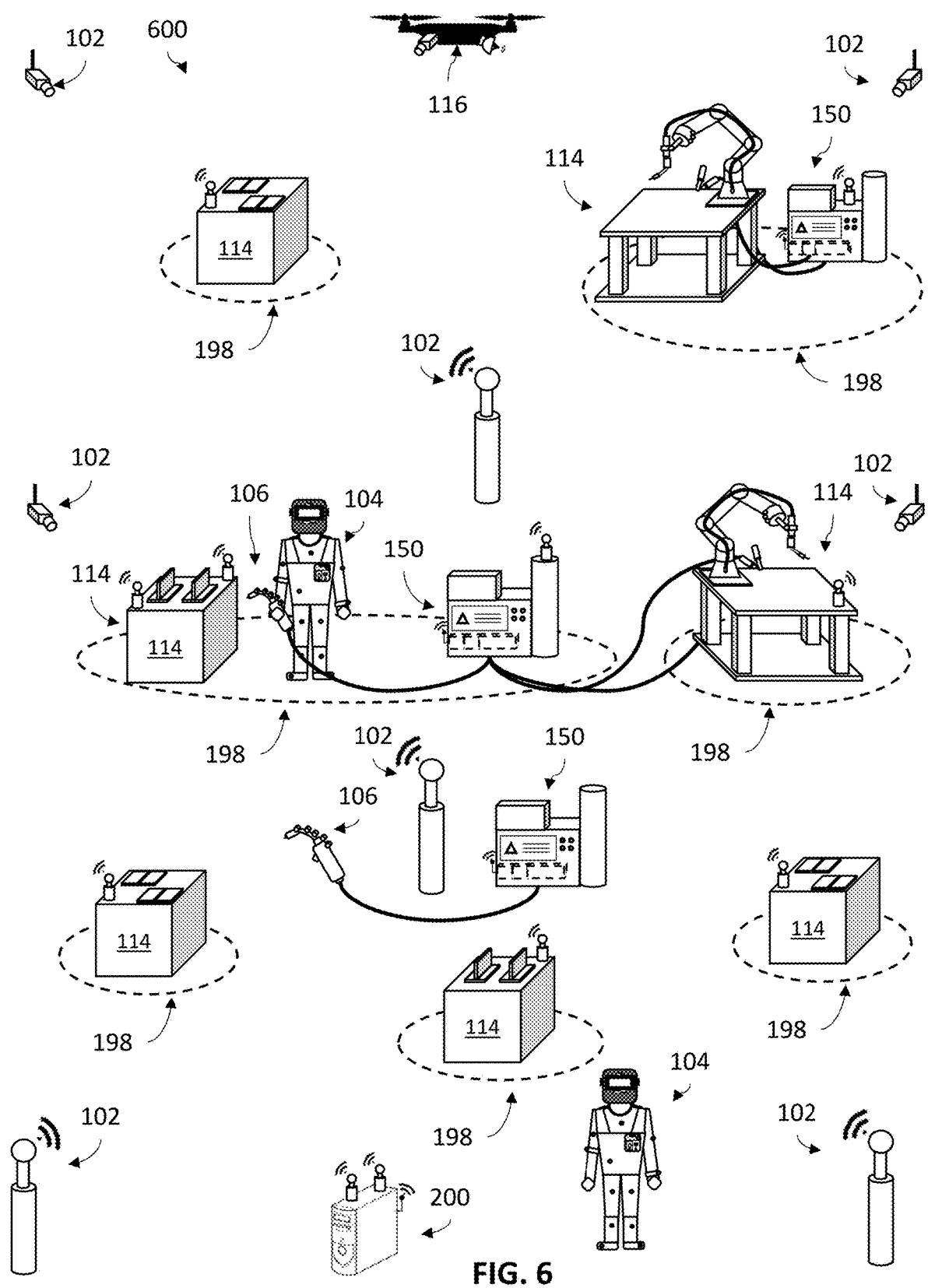
FIG. 6 shows an example of a facility having several welding areas, in and/or around which the weld monitoring system of FIGS. 1-2a may track a position and/or orientation of an operator and/or welding-type tool, in accordance with aspects of this disclosure.

FIG. 6 is a diagram showing an example facility 600 having numerous welding areas 198 at different positions within the facility 600. As shown, some welding areas 198 differ from others, be it with respect to the proximity of welding-type equipment 150, the type of workpieces 126, the type of workbench 114 (e.g., with or without a robot), and/or other aspects. The difference in welding areas 198 may impact whether certain welding areas 198 are or are not used for certain jobs/parts.

In the example of FIG. 6, several tracking sensors 102 are positioned around the facility 600 and/or welding areas 198. In some examples, the tracking sensors 102 around the facility 600 may allow the weld monitoring system 100 to track positions and/or orientations of operators 104 and/or tools 106 in the facility 600, and/or determine whether those positions correspond to a job/part position (and/or the position of an associated welding area 198). In some examples, the welding areas 198 may be spaced (and/or the positions and/or thresholds in the database 280 configured) such that an operator 104 and/or tool 106 will never be determined to be proximate two different job/part positions (and/or two different welding areas 198).

If the instruction generation process 400 determines the tool 106 and/or operator 104 is proximate a job/part position at block 406, the instruction generation process 400 proceeds to block 408 where the relevant job and/or part is identified. In some examples, this identification may involve analysis of input information received at block 406. In some examples, the job/part identification may involve analysis of the associations of job/part identifiers and positions (and/or position identifiers) in the database 280. In some examples, the instruction generation process 400 may prompt the operator 104 (e.g., via the computing I/O devices 204) to confirm the identified job/part is correct. To the extent the operator 104 indicates the identification is incorrect, an error may be output, and/or the instruction generation process 400 may return to block 404.

In some examples, the instruction generation process 400 may provide a list of the closest identified jobs/parts (e.g., ordered according to proximity, selection/identification frequency, perceived likelihood, etc.). For example, there may be a conflict where the tracked position of the tool 106 and/or the operator 104 is within a threshold distance of two or more stored job/part positions. In some examples, the instruction process 300 may prompt the operator 104 to select the correct job/part from the provided list of jobs/parts. In some examples, the instruction process 300 may automatically select a job/part (e.g., according to proximity, selection frequency, perceived likelihood, etc.) if the operator 104 neglects to make a selection (e.g., after some threshold time limit).

After the job/part identification at block 408, the instruction generation process 400 proceeds to block 410 where the instruction generation process 400 determines whether a welding-type operation is occurring. In some examples, the instruction generation process 400 may receive manual input (e.g., via the I/O devices 204) indicating a welding-type operation is or is not occurring, and the determination of whether a welding-type operation is occurring may involve simply analysis of the manual input. In some examples, the determination may involve analysis of sensor data (e.g., captured by the tracking sensors 102) to determine whether certain environmental properties proximate the tracked operator 104 and/or tool 106 position(s) are indicative of a welding-type operation occurring (e.g., light intensity, light frequency, acoustic intensity, acoustic frequency, fumes, electromagnetics, etc. above, below, and/or between certain thresholds).

In some examples, determination of whether a welding-type operation is occurring may involve communications with the welding-type equipment 150, welding tool 106, and/or other welding devices 250 being used by the operator 104. In some examples, determination of whether a welding-type operation is occurring may involve analysis of the state of, information detected by, and/or outputs of, the welding-type equipment 150, welding tool 106, and/or other welding devices 250 being used by the operator 104.

For example, the instruction generation process 400 may analyze the output(s) of the welding-type tool 106 to see if an activation signal is being sent by the welding-type tool 106 (e.g., indicating that the welding-type tool is being activated to perform a welding-type operation). As another example, the instruction generation process 400 may analyze the state of, information detected by, and/or outputs of the welding-type equipment 150 to determine whether the gas flow rate, wire feed speed, output current/voltage, and/or other welding parameters are indicative of an active welding-type operation (e.g., above, below, and/or between certain thresholds).

In the example of FIG. 4, the instruction generation process 400 returns to block 404 if it is determined at block 410 that a welding-type operation is not occurring. However, if a welding-type operation is determined to be occurring, the instruction generation process 400 proceeds to block 412 where the instruction generation process 400 identifies the welding position(s) where the welding-type operation is occurring.

In some examples, the welding position(s) may be determined to be the same as the operator 104 or tool 106 position. In some examples, the welding position(s) may be determined to be slightly offset from the position of the operator 104 or tool 106. For example, the tool position may be a position of a handle, neck, or nozzle of the tool, and the welding position may be determined to be a certain offset distance and/or direction from an end of the nozzle. As another example, the position of the operator 104 may be a position of a wristband or glove of the operator 104, and the welding position may be determined to be a certain offset distance and/or direction from the wristband or glove. In some examples, the instruction generation process 400 may use a model of the tool 106, a model of the operator 104, one or more default values, and/or one or more other properties of the tool 106 and/or operator 104 (e.g., stored in memory circuitry 206, the Tools table 282g, the Operators table 282f, etc.) to determine the welding position.

In some examples, the welding position(s) may be determined relative to another position. For example, the welding position(s) may be determined relative to a (e.g., central and/or reference) position of the identified job, part, and/or welding area 198 (e.g., stored in the Jobs and/or Parts tables 282, and/or other portion of database 280 and/or memory circuitry 206). For example, in the example of FIG. 1, the reference position might be the position of the tracking sensor 102 on the stanchion 110, the position of the tracking sensor 102 on the welding bench 114, a corner or center of the welding bench 114, or some other position.

In some examples, using relative welding positions may allow the welding position information to remain relevant and/or accurate for a particular job/part even if the job and/or part is moved to a different position and/or welding area 198 in the facility 600 (or in a different facility 600). For example, after being moved, the job and/or part (and/or the corresponding rows in the Job and/or Part tables 282) may be associated with the different/new position. In such an example, the welding positions associated with the job and/or part may continue to be accurate and/or relevant with respect to the new job/part location. Thus, using relative welding positions may allow for one or two saved job/part positions to be changed rather than numerous saved welding positions (and also the job/part position(s)). In some examples, the monitoring system 100 and/or tracking system 202 may be calibrated to recognize and/or properly track positions relative to the reference positions of each job and/or part.

In some examples, the welding position(s) may be predetermined and/or prerecorded (e.g., in memory circuitry 206 and/or the database 280). In some examples, a welding position within a threshold distance of the tool and/or operator 104 may be identified as the relevant welding position (e.g., similar to that which is discussed above with respect to the jobs/parts of block 406). In some examples (e.g., where there are several possibilities), a list of welding positions within a threshold distance may be presented via the I/O devices 204 (e.g., ordered according to proximity, selection/identification frequency, perceived likelihood, etc.), and the operator 104 may identify the desired welding position. In some examples, the instruction process 300 may automatically select the welding position (e.g., according to proximity, selection frequency, perceived likelihood, etc.) if the operator 104 neglects to make a selection (e.g., after some threshold time limit).

In the example of FIG. 4, after block 412, the instruction generation process 400 proceeds to block 414 where the instruction generation process 400 identifies one or more tracking sensors 102 that may be useful for generating welding instructions (e.g., by capturing pictures/videos, sound recordings, electromagnetic recordings, etc. of the welding-type operation). In some examples, the instruction generation process 400 may identify the one or more tracking sensors 102 based on which tracking sensors 102 are (e.g., most) proximate the welding position, and/or within detection range of the welding position. In some examples, the instruction generation process 400 may identify the one or more tracking sensors 102 based on which tracking sensors 102 have (or can be reoriented to have) a clear unobstructed field of view of the welding position, part, tool 106, and/or operator 104.

For example, in the example of FIG. 1, the instruction generation process 400 might select the tracking sensors 102 attached to the welding helmet 118, the tracking sensor 102 attached to the fixture 108 that is above and to the right of the operator 104, and/or the tracking sensor(s) 102 attached to the UAV 116. As another example, in the example of FIG. 6, the instruction generation process 400 might select the tracking sensors 102 proximate the middle of the facility 600, closest to the operator 104 holding the tool 106.

In some examples, the memory circuitry 206 may store the positions of each (e.g., fixed) tracking sensor 102. In some examples, the instruction generation process 400 may communicate with the tracking sensor(s) 102 to obtain their positions. In some examples, the instruction generation process 400 may track the positions of some tracking sensors 102 using other tracking sensors 102 (e.g., whose positions are known). In some examples, the instruction generation process 400 may track the positions of some tracking sensors 102 using other tracking sensors 102 to determine which other tracking sensors 102 are closest to the position of the operator 104 and/or tool 106.

Once the one or more tracking sensors 102 are identified and/or selected at block 414, the instruction generation process 400 moves (e.g., translates) and/or reorients (e.g., rotates) the selected tracking sensor(s) 102 as necessary at block 416. In some examples, the instruction generation process 400 may move and/or reorient the tracking sensor(s) 102 to take the tracking sensor(s) 102 closer to the welding position, and/or give the tracking sensor(s) a better (e.g., less obstructed) vantage (e.g., of the tool 106, operator 104, part, welding-type process, etc.). In some examples, moving and/or reorienting the tracking sensor(s) 102 may entail communication with the tracking sensor(s) 102 and/or with the vehicle(s) 116 to which the tracking sensor(s) 102 are attached. Once properly positioned and/or oriented, sensor data (e.g., pertaining to the tool 106, operator 104, part, welding-type process, etc.) is captured by the selected tracking sensor(s) 102 at block 416.

In some examples, the instruction generation process 400 may additionally, or alternatively, use a model of the part (e.g., stored in memory circuitry 206) to generate welding instructions. In some examples, the instruction generation process 400 may select the appropriate model based on information about the part (e.g., part identifier). In some examples, the instruction generation process 400 may further select an orientation and/or perspective (e.g., height, zoom, etc.) of the model to show a view that might be helpful to use with the welding instructions. In some examples, the position(s), orientation(s), and/or vantage(s) of the operator 104, tool 106, and/or selected tracking sensor(s) 102 may be used to select the orientation and/or perspective of the model.

In the example of FIG. 4, after blocks 414-416, the instruction generation process 400 proceeds to block 418 where the instruction generation process 400 identifies the welding equipment 150 and/or other welding devices 250 used by the operator 104 during the welding-type operation. For example, in the example of FIG. 6, the instruction generation process 400 may identify the welding-type equipment 150 in the middle of the facility 600 to which the tool 106 held by the operator 104 is attached (and the operator 104 is proximate), rather than some of the other welding-type equipment 150 in the facility 600.

In some examples, the identification may be based on sensor data captured by one or more tracking sensors 102 (e.g., the tracking sensor(s) 102 selected at block 414). In some examples, the identification may be a manual identification based on input received from the operator 104 (e.g., via the I/O devices 204). While shown as occurring at block 418, in some examples, the identification(s) may instead occur earlier in the instruction generation process 400 (e.g., at block 402).

At block 418, the instruction generation process 400 may further identify one or more parameters used by the welding-type equipment 150 and/or welding devices 250. In some examples, this identification may involve communication with the welding-type equipment 150 and/or welding devices 250. In some examples, the identification may be based on sensor data captured by tracking sensors 102 that pertains to the welding-type equipment 150 and/or welding devices 250.

After block 418, the instruction generation process 400 proceeds to block 420 where the instruction generation process 400 determines and/or identifies one or more welding technique parameters. In some examples, welding technique parameters may include parameters indicative of a technique used by the operator 104 when performing the welding-type operation. For example, welding technique parameters may include a work angle of the welding-type tool 106, a travel angle of the welding-type tool 106, a travel speed of the welding-type tool 106, a travel direction of the welding-type tool 106, an aim of the welding-type tool 106, a distance between a contact tip of the welding-type tool 106 and a workpiece 126 being operated on, a weave frequency of the welding-type tool 106, a weave width of the welding-type tool 106, and/or a dwell time of the welding-type tool 106.

In some examples, one or more of the welding technique parameters may be determined based on the tracked position(s) and/or orientation(s) of the tool 106 and/or operator 104 (e.g., relative to the position and/or orientation of the part/workpiece(s) 126). In some examples, the monitoring system 100 may be calibrated to recognize the position and/or orientation of the part (and/or one or more workpieces 126 of the part), and use the calibration position(s) and/or orientation(s) of the part in conjunction with the tracked position(s) and/or orientation(s) of the tool 106 and/or operator 104 to determine the welding technique parameters.

In the example of FIG. 4, the instruction generation process 400 repeats blocks 414-420 while the welding-type operation is ongoing (e.g., as determined at block 422, similar to block 410 discussed above). In some examples, during each iteration, the sensor data, model parameters, welding parameters, technique parameters, and/or identified welding equipment 150 and/or other welding devices 250 may be saved in memory circuitry 206 (e.g., and/or associated with timestamp data). After the welding-type operation has terminated (e.g., as determined at block 422), the instruction generation process 400 proceeds to block 424, where welding instructions are generated using the sensor data, model parameters, welding parameters, technique parameters, and/or identified welding equipment 150 and/or other welding devices 250.

In some examples, the welding instructions may comprise machine readable instructions. In some examples, the welding instructions may be representative of human perceptible instructions, such as, for example, visual, haptic, and/or audio instructions (e.g., text, images/videos, speech, etc.). In some examples, the welding instructions may provide guidance to an operator 104 as to how and/or when to perform a welding-type operation at the welding position.

For example, the welding instructions may identify the welding-type equipment 150 and/or other welding devices 250 used by the (e.g., expert) operator 104 during the welding-type operation, as well as the welding parameters used by the welding-type equipment 150 and/or other welding devices 250. As another example, the welding instructions may identify the technique parameters used by the operator 104 during the welding-type operation. As another example, the welding instructions may identify where the particular welding-type operation falls in an order of a plurality of welding-type operations, and/or what type of welding-type operation(s) precede and/or follow.

As another example, the welding instructions may include captured sensor data (e.g., images, videos, sounds, electromagnetic readings, thermal readings, etc.) from the welding-type operation (and/or before/after the welding-type operation). As another example, the welding instructions may include one or more (e.g., part and/or workpiece 126) models oriented to show particular perspectives. As another example, the welding instructions may include the time it took the (e.g., expert) operator 104 to perform the welding-type operation, the distance(s) and/or direction(s) the tool 106 and/or operator 104 traveled during the welding-type operation, and/or the positions/orientations of the tool 106 and/or operator 104 during the welding-type operation.

Once the welding instructions are generated, the instruction generation process 400 records the welding instructions in memory circuitry 206 and/or the database 280 at block 426. In some examples, the instruction generation process 400 also records one or more associations between the welding instructions, the weld (and/or welding position), the part, and/or the job. For example, the instruction generation process 400 may create new rows in the Parts table 282a, Jobs table 282b, Job Sessions table 282c, Welding Instructions table 282d, Welds table 282e, and/or Positions table 282h, and associate together the rows using the appropriate identifiers. In some examples, the rows in the Welds table 282e and/or Positions table 282h (as well as the Parts and/or Jobs tables 282) may already exist, and need only be associated with the other rows (e.g., using the appropriate identifier data). While shown as ending after block 426, in some examples, the instruction generation process 400 may instead return to block 404 or 402.

FIG. 5 is a flowchart showing an example operation of the instruction output process 500. As shown, the instruction output process 500 begins at block 502 where the operator 104 and/or tool 106 are identified (e.g., similar to that which is discussed above with respect to block 402 of the instruction generation process 400). However, in some examples, the operator 104 identified at block 502 of the instruction output process 500 may be a less experienced operator 104, rather than an expert operator 104.

After block 502, the instruction output process 500 proceeds to block 504, where the instruction output process 500 tracks the position and/or orientation of the operator 104 and/or tool 106 (e.g., similar to that which is discussed above with respect to block 404 of the instruction generation process 400). Thereafter, the appropriate job and/or part is identified at blocks 506-508 (e.g., similar to that which is discussed above with respect to blocks 406-408 of the instruction generation process 400).

At block 510, the instruction output process 500 loops back to block 504 until and/or unless the tool 106 and/or operator 104 is proximate a position of a weld (e.g., recorded in the Welds table 282e). In some examples, proximity may be determined as discussed above. Once proximate a welding position, the instruction output process 500 identifies the welding instructions associated with the weld at block 508 (e.g., using the identifier associations in the database 282).

After block 512, the instruction output process 500 proceeds to block 514, where the instruction output process 500 outputs the identified welding instructions to the operator 104 (e.g., via the I/O device(s) 204). Thereafter, at block 516, the instruction output process 500 identifies the appropriate welding-type equipment 150 and/or other welding devices 250 that should be used for the welding-type operation (e.g., based on the identified welding instructions). Once the welding-type equipment 150 and/or other welding devices 250 are identified, the instruction output process 500 sets one or more parameters of the identified welding-type equipment 150 and/or other welding devices 250 based on the welding instructions. In some examples, the setting of the parameters may involve communications with the identified welding-type equipment 150 and/or other welding devices 250.

In some examples, the technique parameters output at block 514 may be different than those recorded during the instruction generation process 400. For example, the technique parameters recorded during the instruction generation process 400 may have been ideal for a right handed operator 104 using a particular welding-type tool 106, while the operator 104 identified in the instruction output process 500 is a left handed operator 104, and/or is using a different welding-type tool 106. In such examples, the instruction output process 500 may recommend different (e.g., comparable, next best, etc.) technique parameters.

In some examples, the welding parameters, the identified welding-type equipment 150, and/or the identified welding devices 250 may be different from those recorded as part of the welding instructions. For example, the welding instructions may have been generated based on welding parameters, welding-type equipment 150, and/or other welding devices 250 used by an expert operator 104, and the operator 104 identified at block 502 may not be qualified and/or authorized to use the same welding parameters, welding-type equipment 150, and/or other welding devices 250. As another example, the operator 104 identified at block 502 may be working in a different facility 600, where the welding-type equipment and/or other welding devices 250 are not available. Further, the available welding-type equipment and/or other welding devices 250 may not be operable with all of the welding parameters recommended by the welding instructions.

In some such examples, the instruction output process 500 may identify, recommend, select, and/or use different (e.g., comparable, next best, etc.) welding parameters, welding-type equipment 150, and/or other welding devices 250. In some examples, the instruction output process 500 may present a recommendation and/or options (e.g., via the I/O devices 204), and wait for a threshold time period for a selection from the operator 104 before making an automatic selection. While shown as ending after block 516, in some examples, the instruction output process 500 may instead return to block 502 or 504.

The disclosed weld monitoring system 100 can use its tracking system 202 and instruction generation process 400 to automatically generate welding instructions that can help guide the next operator 104 through a similar welding-type operation. The welding instructions may also be automatically provided to the next operator 104 when a similar welding-type operation must be performed at a similar welding position. The automatic generation of the welding instructions may save a significant amount of time and/or resources that might otherwise go into manual generation of welding instructions. The automatic provision of appropriate welding instructions may reduce the risk of erroneous welding instructions being provided for a particular welding-type operation.

The present methods and/or systems may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type refers to welding (including laser welding and/or hot wire welding), cladding (including laser cladding), brazing, plasma cutting, induction heating, carbon arc cutting or gouging, hot wire preheating, and/or resistive preheating.

As used herein, a welding-type tool refers to a tool suitable for and/or capable of welding (including laser welding and/or hot wire welding), cladding (including laser cladding), brazing, plasma cutting, induction heating, carbon arc cutting or gouging, hot wire preheating, and/or resistive preheating.

As used herein, welding-type power refers to power suitable for welding (including laser welding and/or hot wire welding), cladding (including laser cladding), brazing, plasma cutting, induction heating, carbon arc cutting or gouging, hot wire preheating, and/or resistive preheating.

As used herein, a welding-type power supply and/or welding-type power source refers to a device capable of, when input power is applied thereto, supplying output power suitable for welding (including laser welding and/or hot wire welding), cladding (including laser cladding), brazing, plasma cutting, induction heating, carbon arc cutting or gouging, hot wire preheating, and/or resistive preheating; including but not limited to transformer-rectifiers, inverters, converters, resonant power supplies, quasi-resonant power supplies, switch-mode power supplies, etc., as well as control circuitry and other ancillary circuitry associated therewith.

What is claimed is:
1. A welding system, comprising:
a tracking system configured to track, during a welding-type operation, a tool position or a tool orientation of a welding-type tool, or an operator position or an operator orientation of a welding operator handling the welding-type tool, wherein the tracking system comprises
a sensor system configured to capture sensor data relating to the welding-type operation, or a work- piece or joint being operated on during the welding-type operation, the sensor system comprising a plurality of sensors;

memory circuitry; and processing circuitry configured to:
- identify a welding technique parameter used during the welding-type operation, based on the tool position, the tool orientation, the operator position, or the operator orientation,
- select a particular sensor of the plurality of sensors, or position or orient the particular sensor, for capture of the sensor data based on the tool position, the tool orientation, the operator position, or the operator orientation,
- generate one or more welding instructions for the welding-type operation based on the welding technique parameter and the sensor data, and
- record, in the memory circuitry, the one or more welding instructions.

2. The welding system of claim 1, wherein the welding technique parameter comprises a work angle of the welding-type tool, a travel angle of the welding-type tool, a travel speed of the welding-type tool, a travel direction of the welding-type tool, an aim of the welding-type tool, a distance between a contact tip of the welding-type tool and a workpiece being operated on, a weave frequency of the welding-type tool, a weave width of the welding-type tool, or a dwell time of the welding-type tool.

3. The welding system of claim 1, wherein the one or more welding instructions pertain to how or when to perform the welding-type operation.

4. The welding system of claim 3, wherein the one or more welding instructions comprise one or more visual, haptic, or audio instructions.

5. The welding system of claim 3, wherein the one or more welding instructions comprise one or more machine instructions.

6. The welding system of claim 1, wherein the processing circuitry is further configured to:
- identify a welding position of the welding-type operation based on the tool position, the tool orientation, the operator position, or the operator orientation.

7. The welding system of claim 6, wherein the processing circuity is further configured to:
- record, in the memory circuitry, an association between the welding position and the one or more welding instructions.

8. The welding system of claim 1, wherein the memory circuitry is configured to store a model of a part being operated on during the welding-type operation.

9. The welding system of claim 8, wherein the processing circuitry is further configured to generate, for the welding-type operation, the one or more welding instructions based on the welding technique parameter, the sensor data, and the model.

10. The welding system of claim 1, wherein the processing circuitry is further configured to:
- identify a welding parameter used during the welding-type operation,
- wherein generating the one or more welding instructions comprises generating the one or more welding instructions based on the welding parameter and the welding technique parameter.

11. A method, comprising:
- tracking, during a welding-type operation, via a tracking system, a tool position or a tool orientation of a welding-type tool, or an operator position or an operator orientation of a welding operator handling the welding-type tool;
- capturing, via a sensor system of the tracking system, sensor data relating to the welding- type operation, or a workpiece or joint being operated on during the welding-type operation, wherein the sensor system comprises a plurality of sensors;
- identifying, via processing circuitry, a welding position of the welding-type operation, and a welding technique parameter used during the welding-type operation, based on the tool position, the tool orientation, the operator position, or the operator orientation;
- selecting, via the processing circuitry, a particular sensor of the plurality of sensors, or positioning or orienting the particular sensor, for capture of the sensor data based on the tool position, the tool orientation, the operator position, or the operator orientation;
- generating, via the processing circuitry, one or more welding instructions for the welding-type operation based on the welding technique parameter and the sensor data; and
- recording, in memory circuitry, the one or more welding instructions.

12. The method of claim 11, wherein the welding technique parameter comprises a work angle of the welding-type tool, a travel angle of the welding-type tool, a travel speed of the welding-type tool, a travel direction of the welding-type tool, an aim of the welding-type tool, a distance between a contact tip of the welding-type tool and a workpiece being operated on, a weave frequency of the welding-type tool, a weave width of the welding-type tool, or a dwell time of the welding-type tool.

13. The method of claim 11, wherein the one or more welding instructions pertain to how or when to perform the welding-type operation.

14. The method of claim 13, wherein the one or more welding instructions comprise one or more visual, haptic, or audio instructions.

15. The method of claim 13, wherein the one or more welding instructions comprise one or more machine instructions.

16. The method of claim 11, further comprising:
- identifying, via the processing circuitry, a welding position of the welding-type operation based on the tool position, the tool orientation, the operator position, or the operator orientation.

17. The method of claim 16, further comprising:
- recording, in the memory circuitry, an association between the welding position and the one or more welding instructions.

18. The method of claim 11, further comprising storing a model a part being operated on during the welding-type operation.

19. The method of claim 18, wherein generating the one or more welding instructions comprises generating the one or more welding instructions based on the welding technique parameter, the sensor data, and the stored model of the part being operated on during the welding-type operation.

20. The method of claim 11, further comprising identifying a welding parameter used during the welding-type operation, wherein generating the one or more welding instructions comprises generating the one or more welding instructions based on the welding parameter and the welding technique parameter.

\* \* \* \* \*